Jan. 10, 1967            H. GRAM            3,296,822

APPARATUS FOR THE PRODUCTION OF FROZEN BODIES

Filed Jan. 26, 1965

INVENTOR

Hans Gram

BY Watson, Cole, Grindle & Watson

ATTORNEY

United States Patent Office 3,296,822
Patented Jan. 10, 1967

3,296,822
APPARATUS FOR THE PRODUCTION
OF FROZEN BODIES
Hans Gram, Vojens, Denmark, assignor to Brødrene
Gram A/S, Vojens, Denmark
Filed Jan. 26, 1965, Ser. No. 428,141
Claims priority, application Denmark, Feb. 4, 1964, 536
3 Claims. (Cl. 62—341)

This invention relates to an apparatus for the production of frozen bodies, said apparatus being of the type comprising a plurality of freezing pockets mounted in a freezing table.

In the previously known apparatuses of this type, it has only been possible to produce frozen bodies of very simple shape.

It is the object of the invention to devise an apparatus of the type referred to, by means of which frozen bodies of very complicated shape may be produced.

With this object in view, according to the invention, the lower portion of the freezing pockets has a downwardly tapering shape, and the apparatus comprises a plurality of plungers, the circumferential shape of which approximately corresponds to the circumferential shape of the upper portion of the pockets, and the end surface of which is profiled.

By this arrangement it becomes possible to produce frozen bodies of very complicated shape, viz. all geometrical shapes in which imaginary separating surfaces may be laid in, from which the bodies have a tapering shape in both directions.

In order to obtain a good transfer of cold to the portion of the frozen bodies moulded by means of the plungers, the plungers may, according to the invention, be hollow and filled with a medium of good heat conductivity.

In an apparatus of the type referred to for the production of frozen bodies with carrying sticks, the plungers may be constructed with an axial bore, through which the carrying stick may be introduced into the body during the freezing operation.

In order to facilitate removal of the frozen bodies the end face of the plunger may according to the invention have an undercut portion, whereby it becomes possible to lift the frozen body out of the freezing pocket, in which it has been frozen, by means of the plunger. This construction of the plungers may be used with particular advantage in the case of the freezing of pre-made articles or articles not to be provided with a carrying stick.

Figure 1:
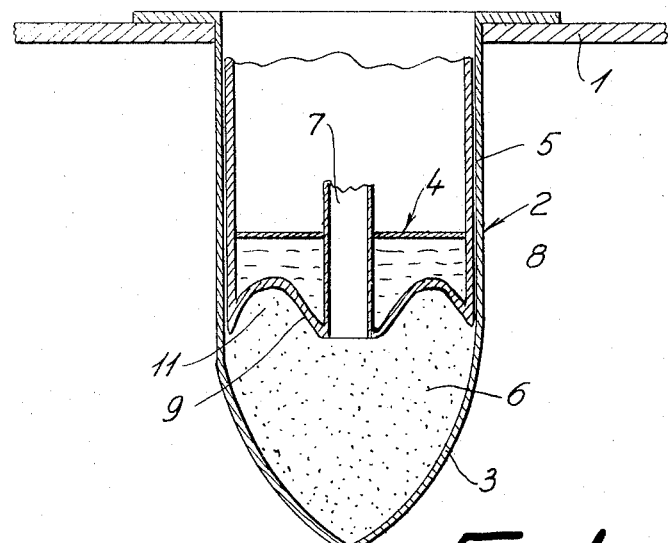
Figures 2, 3:
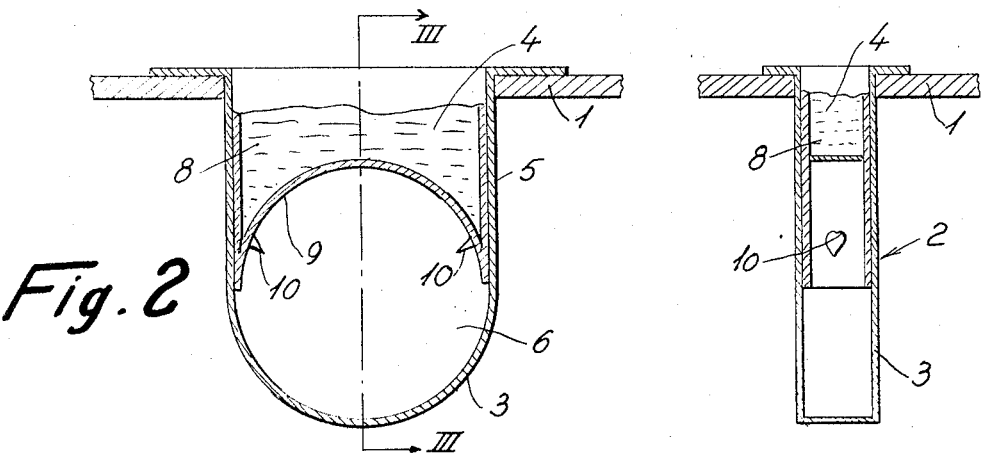
Figure 4:
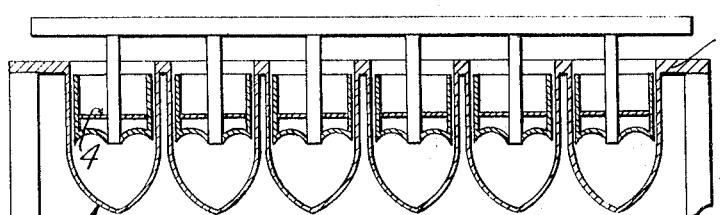

The invention will now be explained in further detail with reference to the accompanying drawing, in which FIG. 1 shows a section through the characteristic portion of one form of an apparatus according to the invention, FIG. 2 is a similar section through a modified embodiment, FIG. 3 is a section along the line III—III in FIG. 2, and FIG. 4 is a cross-sectional view showing an apparatus constructed in accordance with the present invention for freezing a plurality of frozen bodies.

In FIGS. 1 and 4, 1 is part of a circular table, in which a plurality of freezing pockets are mounted, one such freezing pocket being shown at 2 in the drawing. The lower portion of the freezing pocket 2 has a downwardly tapering cross section. 4 is a plunger associated with the freezing pocket 2, said plunger having substantially the same circumferential shape as the upper portion 5 of the freezing pocket.

6 is a batch of freezing goods to be frozen by means of a refrigerating medium surrounding the pocket 2.

In the middle of the plunger a passage 7 is provided, through which a carrying stick can be introduced into the freezing goods 6. The plunger is hollow and filled with a medium 8 of good heat conductivity in order to obtain a good transfer of cold to the end 9 of the plunger 4. The said end is profiled in accordance with the desired shape of the frozen body supplemental to the shape produced by the lower portion 3 of the freezing pocket 2.

The apparatus illustrated in FIGS. 2 and 3 likewise comprises the table 1, a plurality of freezing pockets 2, a plunger 4 individually associated with the freezing pockets. The apparatus here considered is particularly intended for use in the deep-freezing of pre-made article or articles that are not to be provided with a carrying stick. With this object in view, the lower portion 3 of the freezing pocket in conjunction with the end face 9 of the plunger 4 forms a flat circular cavity. The end 9 of the plunger has undercut portions 10 in the form of pegs that may be used for anchoring a frozen body relative to the plunger so that the latter may be used for lifting the body out of the freezing pocket. Also in the embodiment of FIGS. 2 and 3 the plunger is hollow and filled with a medium 8 of good heat conductivity.

To use the apparatus illustrated in FIGS. 1 and 4, a batch of freezing goods is filled into the freezing pocket 2 and thereafter the plunger 4 is moved downwards so that the desired shape of the material enclosed in the freezing pocket is obtained by means of the end face 9. During the introduction of the plunger into the freezing pocket, the air present in the upper portion of the latter escapes either through the passage 7 or along the sides of the plunger. The embodiment of FIG. 1 has to do with the freezing of a heart-shaped article, and in this case the plunger may be constructed with air escape passages so that freezing material is permitted to penetrate into the recesses serving to shape the raised portions 11 of the heart-shape. The freezing material is sufficiently stiff to maintain the shape, in which the body has been frozen.

I claim:

1. An apparatus for the production of frozen bodies in a plurality of freezing chambers, comprising a freezing table, a plurality of pockets mounted in said freezing table, each pocket having an upper and lower portion, the lower portion of said pockets having a downwardly tapering shape, a plurality of corresponding plungers to be positioned in said pockets, each plunger having an end surface extending across the pocket so as to close the same and thereby form said freezing chambers, the sides of each plunger having a sliding fit in the upper portion of the pocket, and a cavity formed in the end surface of each plunger so as to face the lower portion of the pocket, whereby said frozen bodies are shaped by said chambers with a tapered lower section and a projecting upper section corresponding to the lower portion of the pocket and the cavity in the end surface of the plunger, respectively.

2. An apparatus according to claim 1, wherein each plunger is hollow and wherein is provided a material having a high coefficient of heat conductivity filling each plunger to improve the heat transfer from said end surface through the plunger to speed the formation of said frozen bodies.

3. An apparatus according to claim 1, wherein is provided a pin carried by each of said plungers, each pin extending outwardly from the end surface and projecting into the cavity, whereby each plunger is attached to the frozen body to allow removal of the same from the pocket upon withdrawal of said plunger.

References Cited by the Examiner
UNITED STATES PATENTS

| | | | |
|---|---|---|---|
| 1,939,334 | 12/1933 | Burke | 62—356 X |
| 2,282,544 | 5/1942 | Rosberg | 62—341 X |
| 3,104,665 | 8/1963 | Towns | 249—121 X |

LLOYD L. KING, *Primary Examiner.*

ROBERT A. O'LEARY, *Examiner.*

N. R. WILSON, *Assistant Examiner.*